(12) United States Patent
Foran

(10) Patent No.: US 6,957,494 B1
(45) Date of Patent: Oct. 25, 2005

(54) DARK-BANDED VIAL FOR USE WITH LEVEL

(75) Inventor: Thomas P. Foran, Shorewood, WI (US)

(73) Assignee: Empire Level Mfg. Corp., Mukwonago, WI (US)

( * ) Notice: Subject to any disclaimer, the term of this patent is extended or adjusted under 35 U.S.C. 154(b) by 0 days.

(21) Appl. No.: 10/826,854

(22) Filed: Apr. 16, 2004

(51) Int. Cl.⁷ .............................................. G01C 9/32
(52) U.S. Cl. ............................................ 33/379; 33/348
(58) Field of Search ........................... 33/348, 379–390

(56) References Cited

U.S. PATENT DOCUMENTS

| | | | | |
|---|---|---|---|---|
| 1,082,163 A | | 12/1913 | Lung | 33/381 |
| 2,362,872 A | * | 11/1944 | Weagle | 33/348 |
| 2,576,202 A | * | 11/1951 | Wullschleger | 33/390 |
| 4,542,592 A | * | 9/1985 | Hopkins | 33/386 |
| 4,663,856 A | * | 5/1987 | Hall et al. | 33/373 |
| 4,794,701 A | * | 1/1989 | Clark | 33/379 |
| 5,111,589 A | * | 5/1992 | Tate | 33/385 |
| 5,207,004 A | | 5/1993 | Gruetzmacher | 33/382 |
| 5,414,937 A | | 5/1995 | Denley | 33/379 |
| 5,749,152 A | | 5/1998 | Goss et al. | 33/381 |
| 5,755,037 A | * | 5/1998 | Stevens | 33/382 |
| 6,115,928 A | * | 9/2000 | Dauerer | 33/348 |
| 6,546,638 B2 | | 4/2003 | Beyer | 33/348 |

* cited by examiner

*Primary Examiner*—G. Bradley Bennett
(74) *Attorney, Agent, or Firm*—Jansson, Shupe, Munger & Antaramian, Ltd.

(57) ABSTRACT

A vial, level including such vial, and method of using such level are disclosed. The vial comprises a body having first and second ends, a midpoint, and interior and exterior surfaces, at least one marker ring connected with respect to the body, a bubble positioned in the cavity and defined by an interface, and first and second dark-colored bands circumscribing the cavity. The vial enhances the visibility of the bubble through the reflection of the first and second bands on the interface such that the interface along the perimeter of the bubble appears dark-colored.

13 Claims, 2 Drawing Sheets

DARK-BANDED VIAL FOR USE WITH LEVEL

FIELD OF THE INVENTION

This invention is related generally to vials and, more particularly, to vials enclosing a bubble for use in levels.

BACKGROUND OF THE INVENTION

It has long been known to utilize the effect of gravity on fluids having different densities to determine the levelness of elements such as building components, machines, lines, poles, etc. Spirit levels, also called bubble levels, are well known instruments utilizing gravity in this way to set horizontal or vertical surfaces. Such levels include a sealed vial containing a bubble, typically air, floating in a non-freezing liquid, usually mineral spirits. The measured surface is considered horizontal or vertical when the air bubble rests between predetermined graduated marks on the vial.

The accuracy with which a horizontal or vertical plane can be determined is critically dependent on the accuracy at which the bubble is centered between the transverse marks on the vial which, of course, is dependent on the visibility of such lines and the outline of the bubble itself. While the position of the bubble can readily be seen under normal lighting conditions, it becomes difficult to see on a heavily clouded day, or at dusk, or in poorly lighted spaces. That is to say, typical conventional levels can be effectively used only in relatively well-lighted environments and, accordingly can put constraints on the times and places craftsmen such as carpenters and bricklayers are able to work efficiently.

Because it is frequently necessary to measure or set the levelness of a horizontal surface or to set or plumb a vertical surface in less than ideal conditions for locating the position of the bubble in the vial there have been many attempts to provide a level having a more easily located bubble. For instance, others have provided an illumination device in the level to illuminate the vial to enhance visibility of the bubble. Another attempt to enhance bubble visibility included the use of a floating object within the vial. Still other attempts have utilized complicated electrical or fiber optic sensing of the bubble position.

Each of these prior art attempts have failed to provide a simple and inexpensive, yet successful method of overcoming bubble-locating problems. For example, bubble illumination devices may work well in dark conditions, but they provide little assistance when operating in dimly lit or more well lit areas in which the bubble may blend in with the background when viewing the vial. Floats may increase visibility, but their inclusion in the vial often results in less precise measurements. Levels including electrical and fiber optic sensing means are typically too expensive and too sensitive to be handled easily at work sites and may not provide any enhancement to viewing the bubble in certain conditions.

Therefore, there is a need for an improved vial and level which provide increased visibility of the bubble to aid in the location of the bubble during measurements. Furthermore, there is a need for such an improved vial and level which do not require special handling at work sites and which do not require significant additional costs of manufacturing. In addition, there is a need to provide a vial and level which operate well in a variety of lighting conditions and which provide for easy location of the bubble within the vial.

OBJECTS OF THE INVENTION

It is an object of the invention to provide an improved vial for use in levels which enhances visibility of the bubble therein.

Another object of the invention is to provide a level utilizing a vial providing increased visibility of the bubble therein.

Another object of the invention is to provide a method of measuring the levelness of an element including utilizing a vial providing increased visibility of the bubble therein.

Another object of the invention is to provide a vial having bands circumscribing the vial's cavity and positioned on opposite sides of the cavity's maximum diameter to enhance visibility of the bubble therein.

Another object of the invention is to provide a vial and level having enhanced bubble visibility which do not require special handling at work sites and which do not require significant additional costs of manufacturing.

Another object of the invention is to provide a vial and level providing for enhanced bubble visibility in conditions when the interface between the bubble and liquid in the vial is otherwise difficult to discern.

Still another object of the invention is to provide a level which operates well in a variety of lighting conditions and which provides for easy location of the bubble within the vial.

These and other objects of the invention will be apparent from the following descriptions and from the drawings.

SUMMARY OF THE INVENTION

In at least one embodiment, the invention is a vial for use in a level which provides for enhanced readability. The invention represents a significant advance over the state of the art by providing novel elements, including a pair of bands to increase the visibility of the bubble within the vial.

In one embodiment the vial comprises a body having first and second ends, a midpoint, interior and exterior surfaces, at least one marker ring connected with respect to the body, a cavity, a bubble positioned in the cavity and defined by an interface, and first and second dark-colored bands circumscribing the cavity with the first band positioned between the first end and the midpoint and the second band positioned between the second end and the midpoint. In such a vial, the interface, preferably a gas-liquid interface, reflects the first and second bands to cause the interface to appear dark-colored when viewing the bubble from outside the exterior surface, thereby enhancing visibility of the bubble. As used herein, "dark" or "dark-colored" refer to black and those colors approaching black in hue including, for example, dark grey, dark blue, dark green, dark brown, and the like.

In such an embodiment, the cavity is preferably barrel-shaped, i.e., cross-sections of the cavity increase in diameter, reach a maximum diameter, then decrease in diameter. The maximum diameter is preferably near the midpoint which may or may not be equidistant to the first and second ends. The body is preferably cylindrical.

The bands may be opaque such that light does not pass through them or they may be translucent or tinted such that some light passes through. The bands may be positioned on the exterior surface of the body, on the interior surface of the body, or between the interior and exterior surfaces of the body. Alternatively, the bands may be integral with the body and, in such cases, may be comprised of opaque or translucent portions of the body. In certain embodiments, the bands are wider than the bubble.

The vial may further include first and second end closures. In preferred embodiments, the end closures are integral with the body and include portions of the interior surface which defines the cavity. In certain embodiments, such end closures may be dark-colored and may provide further reflection to the interface in addition to that of the bands.

The at least one marker ring is preferably visible from outside the exterior surface of the vial. The vial preferably includes first and second marker rings which are equidistant to the maximum diameter to allow a user to determine when a bubble is positioned at the maximum diameter. The first ring is preferably positioned between the maximum diameter and the first end and the second ring is preferably positioned between the maximum diameter and the second end. Such rings may be positioned on the exterior surface or on the interior surface, though it is preferred that the rings be positioned between the interior and exterior surfaces.

The invention may also be described as a level for improved measurement. Such a level comprises a measuring surface for contacting an element to be measured, a recess formed in the level at an angular relationship to the measuring surface, and a vial received in the recess. The vial preferably comprises a body having first and second ends, a midpoint, and interior and exterior surfaces, at least one marker ring connected with respect to the body, the at least one marker ring visible from outside the exterior surface, a bubble positioned in the cavity and defined by an interface, and first and second dark-colored bands circumscribing the cavity with the first band positioned between the first end and the midpoint and the second band positioned between the second end and the midpoint. Measurement of the element is facilitated by reflection of the first and second bands on the interface such that the interface appears dark-colored when viewing the bubble. The interface is preferably a gas-liquid interface, though it is believed that it may be the interface between two immiscible fluids.

The interior surface defines a cavity which preferably has a maximum diameter near the midpoint. The bubble rests at the maximum diameter when the vial is oriented perpendicular to the force of gravity. In certain embodiments, the vial includes first and second marker rings equidistant to the maximum diameter, the first ring positioned between the maximum diameter and the first end and the second ring positioned between the maximum diameter and the second end. Such rings may be positioned on the interior surface or exterior surface though it is most preferable that they be positioned between the interior and exterior surfaces.

In a highly preferred embodiment, the maximum diameter is positioned at the midpoint, the first and second marker rings are positioned equidistant to the maximum diameter, and the bands are positioned equidistant to the maximum diameter. In such an embodiment, the reflection of the bands on the interface of the bubble is even, i.e., because the vial is symmetrical, the reflection of the first band on the interface is the same as the reflection of the second band on the interface when viewing the bubble from a position in the plane perpendicular to the vial and including the maximum diameter.

As stated above in reference to another embodiment of the invention, the bands may be opaque such that light does not pass through them or they may be translucent or tinted such that some light passes through. The bands may be positioned on the exterior surface of the body, on the interior surface of the body, or between the interior and exterior surfaces of the body. Alternatively, the bands may be integral with the body and, in such cases, may be comprised of opaque or translucent portions of the body.

The invention also includes a method of measuring the levelness of an element. The method comprises providing a level having a measuring surface and a vial positioned at a predetermined angular relationship thereto, positioning the measuring surface on the element, and assessing the levelness of the element by locating the position of the bubble.

Such a method is facilitated by using a vial comprising a body having first and second ends, a midpoint, and interior and exterior surfaces, the interior surface defining a cavity; at least one marker ring connected with respect to the body, the at least one marker ring visible from outside the exterior surface; a bubble positioned in the cavity, the bubble defined by a gas-liquid interface; and first and second dark-colored bands circumscribing the cavity, the first band positioned between the first end and the midpoint and the second band positioned between the second end and the midpoint.

When using such a vial in the above method, the bands facilitate locating the bubble by reflecting off of the interface to increase visibility of the bubble. Such a method may be further enhanced by using bands which are symmetrical about the maximum diameter of the cavity. As discussed above, such bands may be opaque such that light does not pass through them or they may be translucent or tinted such that some light passes through. The bands may be positioned on the exterior surface of the body, on the interior surface of the body, or between the interior and exterior surfaces of the body. Alternatively, the bands may be integral with the body and, in such cases, may be comprised of opaque or translucent portions of the body.

DETAILED DESCRIPTION OF PREFERRED EMBODIMENTS

Figure 1:
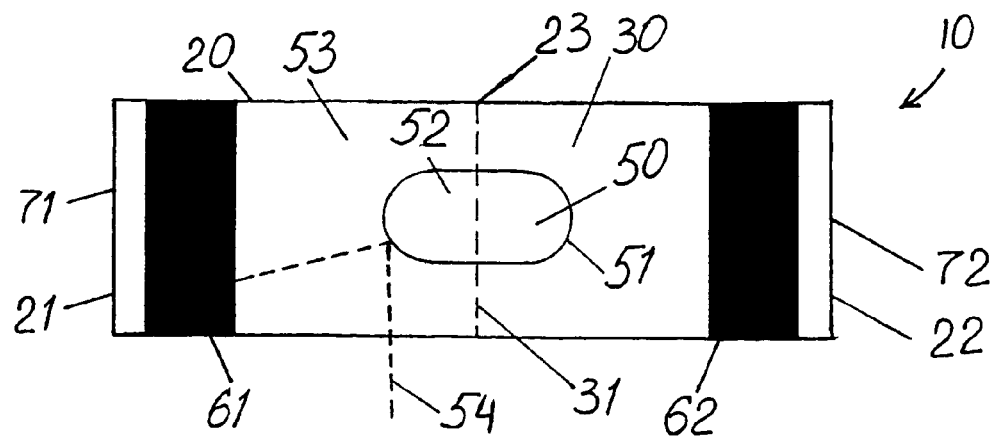
FIG. 1 is a top plan view of a vial in accordance with this invention.

FIG. 1 is a front elevation of an embodiment of vial 10. Vial 10 includes a body 20 having a first end 21 and second end 22 with a midpoint 23 therebetween. Vial 10 is preferably a plastic material such as acrylic, polycarbonate, polystyrene, butyrates or the like, and is transparent. An interior surface 24 of body 20 defines a barrel-shaped cavity 30 such that there exists a cross-section of cavity 30 which has a maximum diameter 31. Maximum diameter 31 is preferably positioned near or at the midpoint 23.

Vial 10 further includes marker rings 41 and 42 connected with respect to body 20. Marker rings 41 and 42 are preferably equidistant to maximum diameter 31. As shown, a bubble 50 is positioned within cavity 30 at maximum diameter 31 and between marker rings 41 and 42. Bubble 50 is defined by a gas-liquid interface 51 with bubble 50 being a gas 52 and the rest of cavity 30 being filled with a liquid 53. Gas 52 is preferably air and liquid 53 is preferably mineral spirits or the like.

Vial 10 also includes dark-colored bands 61 and 62 circumscribing cavity 30. First band 61 is positioned between maximum diameter 31 and first end 21 and second band 62 is positioned between maximum diameter 31 and second end 22.

Vial 10 further includes end closures 71 and 72 at first end 21 and second end 22. First end closure 71 is at first end 21 and second end closure 72 is at second end 22. First and second end closures 71 and 72 are preferably integral with body 20 and enclose cavity 30.

FIG. 1 shows bubble 50 positioned at maximum diameter 31. Viewing line 54 shows how first band 61 is reflected off of interface 51 when viewing vial 10 from the side. As is apparent, innumerable reflections of bands 61 and 62 off of interface 51 provide the viewer with a dark-colored outline of bubble 50 along its perimeter. Interface 51 between the viewer and bubble 50, i.e., the central portion of bubble 50 in FIG. 1, appears to not reflect the bands. In a preferred embodiment, bands 61 and 62 are about 1⁄2 inch wide and are equidistant to bubble 50 when positioned at maximum diameter 31. Each band bands 61 and 62 may be about ½ inch from maximum diameter 31.

Figure 3:
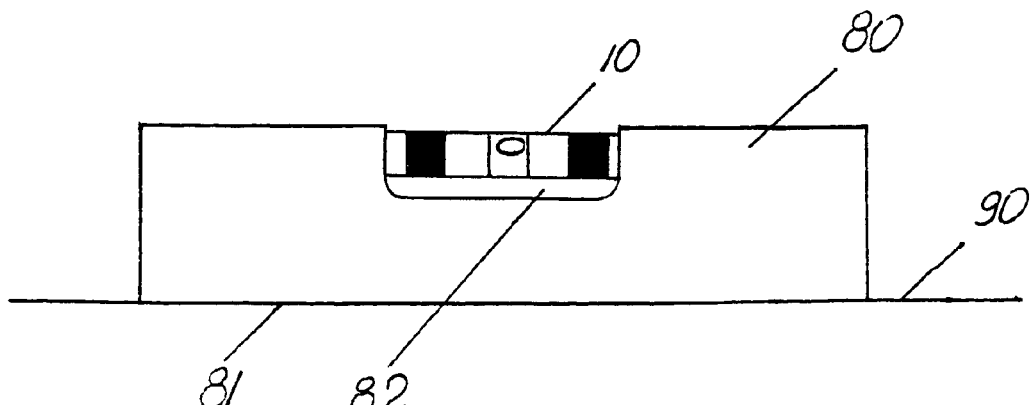
FIG. 3 is a front elevation of a level including the vial of FIGS. 1 and 2.

FIG. 3 is a front elevation of a level 80 including vial 10. Level 80 includes a measuring surface 81 for contacting an element such as a building surface to be measured. A recess 82 is formed in level 80 at an angular relationship to measuring surface 81. Recess 82 receives and holds vial 10 at an angular relationship to measuring surface 81. As shown, vial 10 is parallel to measuring surface 81.

Figure 2:
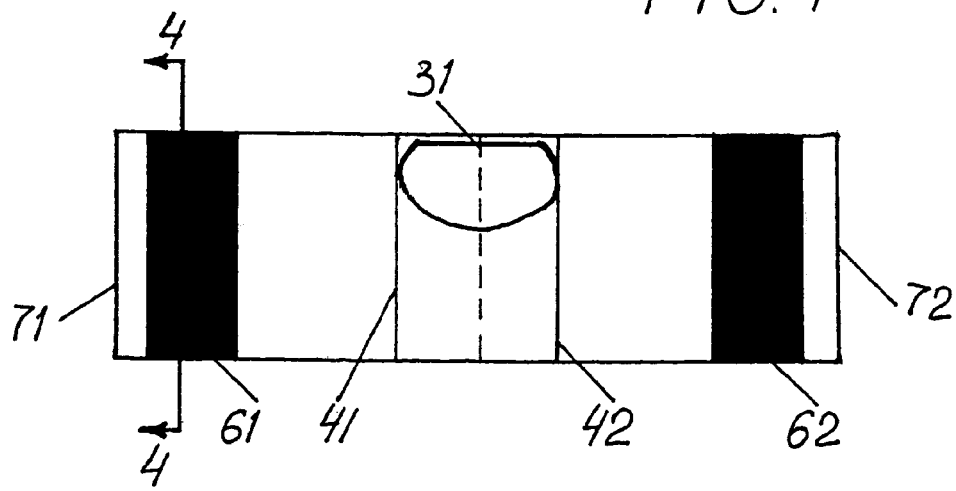
FIG. 2 is a front elevation of the vial of FIG. 1.
Figure 4:
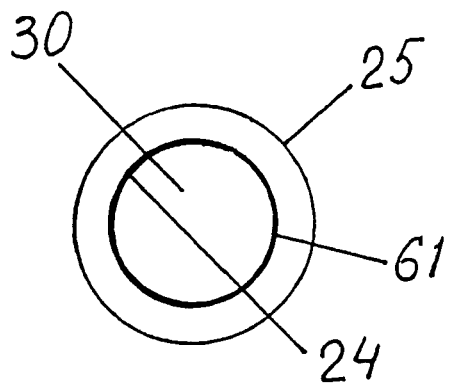
FIG. 4 is a cross section cross-section view of the vial taken along line 4—4 as shown in FIG. 2.
Figure 5:
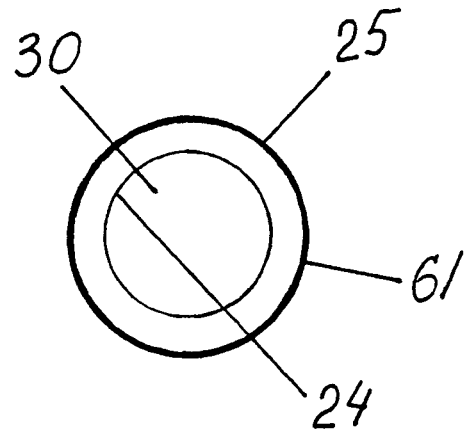
FIG. 5 is a cross-section view similar to FIG. 4 but showing a vial which is an alternate embodiment of the invention.
Figure 6:
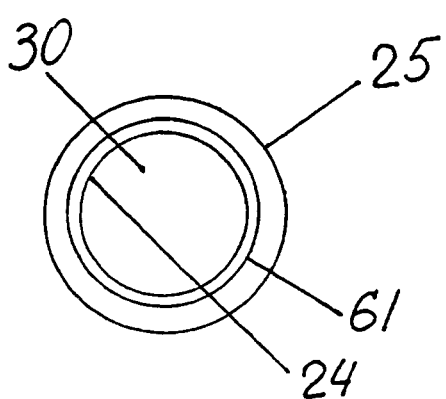
FIG. 6 is a another cross-section view illustrating another vial which is yet another embodiment of the invention.
Figure 7:
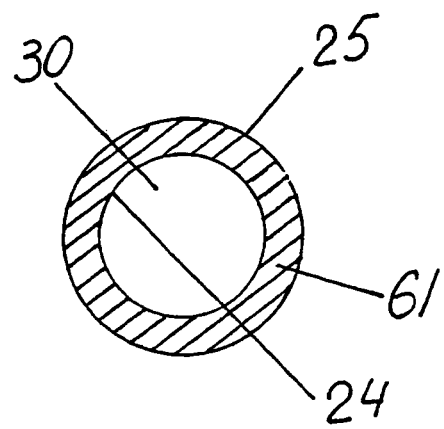
FIG. 7 is a cross-section view of vet another vial showing another embodiment of the invention.

FIG. 5 shows a cross-section view of vial 10 taken along line 4—4 of FIG. 2 in which first band 61 has been applied to an exterior surface 25 of vial 10. FIGS. 4, 6, and 7 are alternate cross-section views of vial 10 taken along line 4—4 of FIG. 2. In FIG. 4, first band 61 is shown on interior surface 24 of vial 10. In FIG. 6, first band 61 is shown in body 20 between interior surface 24 and exterior surface 25. Such an embodiment may include a dual component overmolded vial 10 in which bands 61 and 62 are positioned on an inner cylinder before an outer sleeve is molding around the cylinder and sleeve. In each of these embodiments shown in FIGS. 4–6, bands 61 and 62 may be a foil comprised of metal, thermoset material, thermoplastic material having a high melting point, ink, pigment or other dark material, and bands 61 and 62 may be hot stamped, pressed or rolled into, printed onto or otherwise applied to body 20. In FIG. 7, first band 61 is integral with body 20 and can be said to be positioned between interior surface 24 and exterior surface 25 of body 20. In such an embodiment, bands 61 and 62 may be comprised of opaque or translucent portions of the body.

Thus, it should be apparent that there has been provided, in accordance with the present invention, a vial for use with levels that fully satisfies the objectives and advantages set forth above.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A vial for use in a level, the vial comprising:
   a body having first and second ends, a midpoint, and interior and exterior surfaces, the interior surface defining a barrel-shaped cavity, the cavity having a maximum diameter near the midpoint;
   first and second marker rings connected with respect to the body on either side of the midpoint and visible from the outside of the vial;
   a liquid and gas bubble in the cavity, the bubble defined by the liquid-gas interface; and
   first and second dark bands circumscribing the cavity, the first band positioned between the first end and the first marker ring and the second band positioned between the second end and the second marker ring;
   whereby the interface reflects the first and second dark bands such that the interface appears dark when viewing the bubble to enhance visibility of the bubble.

2. The vial of claim 1 wherein the bands are opaque.

3. The vial of claim 1 wherein the bands are on the exterior surface of the body.

4. The vial of claim 1 wherein the bands are on the interior surface of the body.

5. The vial of claim 1 wherein the bands are between the interior and exterior surfaces of the body.

6. The vial of claim 1 wherein the bands are integral with the body.

7. The vial of claim 1 wherein the body includes first and second dark end closures.

8. A level for improved measurement, the level comprising:
   a measuring surface for contacting an element to be measured;
   a recess formed in the level at an angular relationship to the measuring surface; and
   a vial received in the recess, the vial comprising:
      a body having first and second ends, a midpoint, and interior and exterior surfaces, the interior surface defining a cavity, the cavity having a maximum diameter near the midpoint;
      first and second marker rings connected with respect to the body, on either side of the midpoint and visible from the outside of the vial;
      a liquid and gas bubble in the cavity, the bubble defined by the liquid-gas interface; and
      first and second dark bands circumscribing the cavity, the first band positioned between the first end and the first marker ring and the second band positioned between the second end and the second marker ring;
   whereby measuring the element is facilitated by reflection of the first and second dark bands on the interface such that the interface appears dark when viewing the bubble.

9. The level of claim 8 wherein the bands are opaque.

10. The vial of claim 8 wherein the bands are on one of the surfaces of the body.

11. The vial of claim 8 wherein the bands are between the interior and exterior surfaces of the body.

12. The vial of claim 8 wherein the bands are integral with the body.

13. The vial of claim 8 wherein the vial includes first and second marker rings equidistant to the maximum diameter, the first ring positioned between the maximum diameter and the first end and the second ring positioned between the maximum diameter and the second end.

* * * * *

UNITED STATES PATENT AND TRADEMARK OFFICE
CERTIFICATE OF CORRECTION

PATENT NO.    : 6,957,494 B1                                    Page 1 of 1
DATED         : October 25, 2005
INVENTOR(S)   : Thomas P. Foran It is certified that error appears in the above-identified patent and that said Letters Patent is hereby corrected as shown below:

<u>Column 4,</u>
Line 39, delete duplicated "cross section".
Line 46, delete "vet" and substitute -- yet --.

<u>Column 5,</u>
Line 23, delete "12" and substitute -- 1/2 --.
Line 25, delete "bands".

Signed and Sealed this

Twenty-first Day of March, 2006

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,957,494 B1 | Page 1 of 1 |
| APPLICATION NO. | : 10/826854 | |
| DATED | : October 25, 2005 | |
| INVENTOR(S) | : Thomas P. Foran | |

It is certified that error appears in the above-identified patent and that said Letters Patent is hereby corrected as shown below:

IN THE CLAIMS:

Column 6, line 54, delete "vial" and insert --level--.

Column 6, line 56, delete "vial" and insert --level--.

Column 6, line 58, delete "vial" and insert --level--.

Column 6, line 60, delete "vial" and insert --level--.

Signed and Sealed this
Third Day of March, 2015

Michelle K. Lee
*Deputy Director of the United States Patent and Trademark Office*